UNITED STATES PATENT OFFICE.

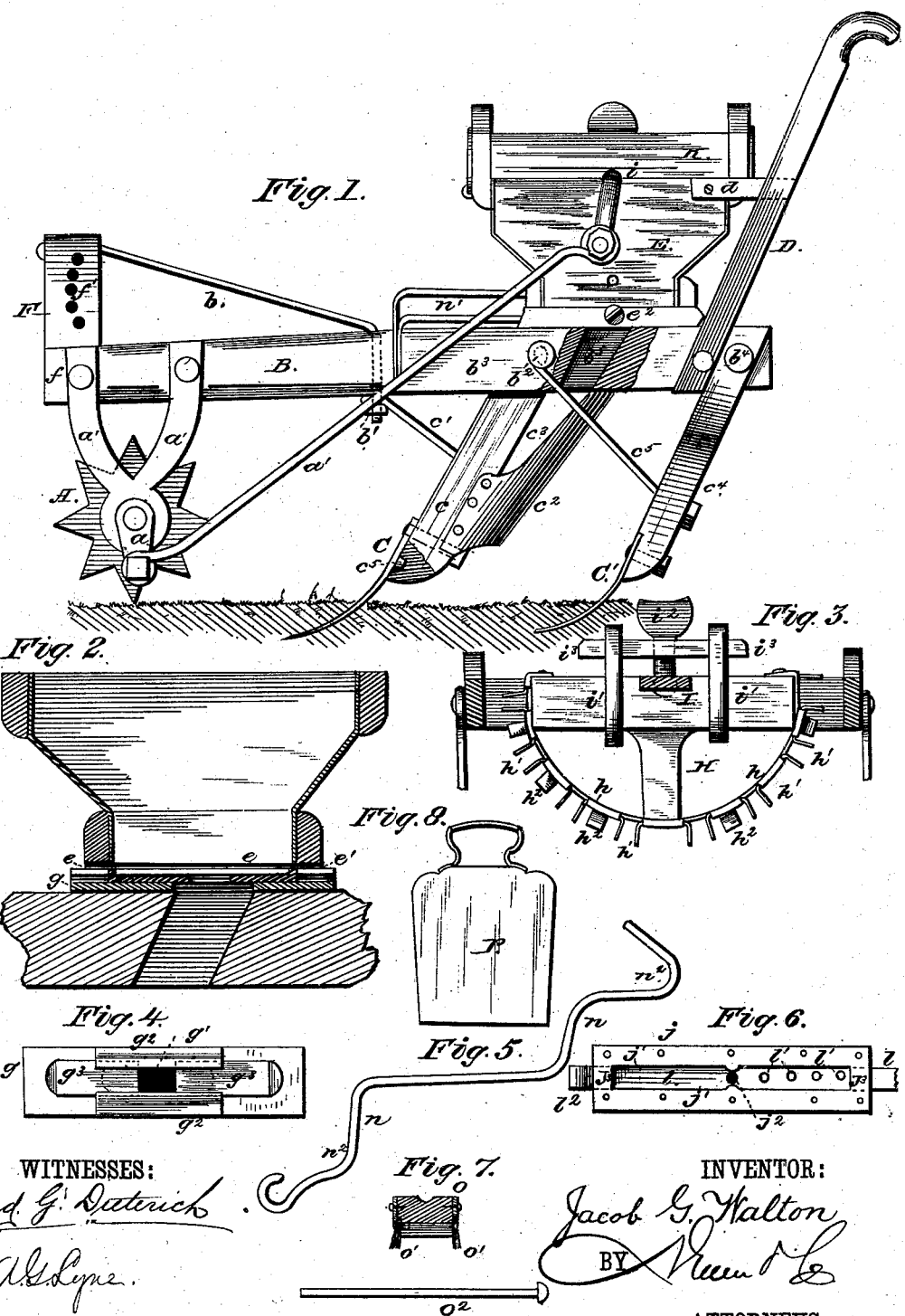

JACOB G. WALTON, OF DAVILLA, TEXAS.

COTTON-PLANTER.

SPECIFICATION forming part of Letters Patent No. 241,459, dated May 10, 1881.

Application filed January 10, 1881. (No model.)

*To all whom it may concern:*

Be it known that I, JACOB G. WALTON, a citizen of the United States, residing at Davilla, in the county of Milam and State of Texas, have invented a new and useful Cotton-Planter, of which the following is a full, clear, and exact description, reference being had to the drawings hereto annexed.

My invention relates to improvements in seed-planters in which a vibrating agitator is used in combination with a hopper; and it consists in certain peculiarities of construction, as hereinafter described and claimed.

In the accompanying drawings, Figure 1 shows a side elevation of my invention, partly in section; Fig. 2, a sectional side view of the hopper; Fig. 3, the cotton-feeder attached to a portion of the dash-board frame; Fig. 4, the cotton-feeding bottom of hopper; and Figs. 5, 6, 7, and 8 show devices which may be used in connection with said hopper for planting corn and other small grain.

The roller or driving-wheel A, beam B, plows C C', handles D, and feed-box or hopper E constitute the frame-work of the machine.

The roller A, which has a crank, $a$, upon its shaft, and is journaled in brackets $a'$, attached to each side of the forward end of beam B, is made without spokes to prevent its being clogged with earth, and has a series of deep notches in its periphery, to enable it to roll with greater facility over rough ground. To this latter end, also, the beam B is provided with an upright draft-head, F, at its end, secured by the bolt $f$, and having a vertical series of horizontal perforations, $f'$, for raising or lowering the clevis, whereby the force of the draft may be thrown at will upon said roller to prevent its being lifted from the ground, thus causing it to rotate steadily where the soil is uneven. The draft-head F is supported by the stay-rod $b$, one end of which is secured to the upper end of said draft-head, while the other end, which is bent downward, passes vertically through the center of the beam, and is secured by a nut, $b'$, on the under side.

The forward or opening plow, C, is attached to the foot-piece $c$ in the usual manner, said foot-piece being secured centrally to the main beam B and side beams, $b^3$, by the horizontal bolt $b^2$ and stay-rod $c'$, the forward end of which is secured by the rod $b$ and nut $b'$. Attached to the rear side of foot-piece $c$, and extending down to its lower end, is the spout $c^2$, for conveying the seed to the furrow, having side openings, $c^3$, through which the dropping of the seeds can be observed. The hindmost or covering plows, C', are arranged so that one will pass on one side and one on the other of the furrow, for the purpose of covering the seed. The foot-pieces $c^4$, to which they are attached, are secured to the rear end of main beam by bolt $b^4$ and strengthened by stays or lugs $c^5$, through the forward ends of which the bolt $b^2$ passes to secure them to the beam B. These shovels C C' are provided with lugs or stays $c^5$ on their rear sides, which fit into perforations in their respective foot-pieces, to obviate the necessity of two bolts for securing them to the same, while said foot-pieces are provided with perforations, whereby the shovels may be raised or lowered for the purpose of varying the depth of the furrow, as some seeds require to be planted deep and others shallow.

The seed-box or hopper E rests upon the rear end of the main beam, being supported by the side beams, $b^3$, to which it is secured, and attached to the handles D by stays $d$. The side beams, $b^3$, are designed primarily to strengthen the main beam, through which a vertical opening, $b^5$, is made just behind the forward plow, to allow the seed to drop. The bottom of the hopper E is made with a longitudinal slot, $e$, into which the removable bottom $g$ is inserted at an opening, $e'$, at the rear of hopper, and held in position by the clamp-screw $e^2$ at its side. The removable bottom $g$, which is for planting cotton, consists of a strip of wood having a longitudinal slot, $g'$, in the center, and provided with cleats $g^2$ upon each side of said slot, for holding in position the end slides, $g^3$, which are designed for diminishing or increasing the length of the slot. When said slot is open full length the cotton-seeds are strown in a continuous row; but when partially closed they are dropped in hills by means of the vibrating feeder H, which consists of a half-wheel clamped to the under side of a rocking shaft, I, having crank $i$, and journaled to the under side of the detachable dash-board frame K. Said feeder H is provided with a series of radial flanges or teeth, $h'$, upon the outer rim of its bow $h$, for stirring the seeds and preventing them from choking the opening in the bottom of hopper. I also arrange lateral flanges or wings $h^2$ upon said rim transversely thereto, for the purpose of reaching the seeds in the sides of hopper and drawing them to the center. Said feeder is clamped to under side of vibrating shaft I by means of cuffs $i'$, which inclose a portion of the frame-work of feeder, and clamp-screw $i^2$, passing through block $i^3$ and resting against the upper side of said shaft. These cuffs $i'$ are made elliptical, so that the feeder can be set higher or lower in the hopper at will by using wedges between shaft and cross-piece of feeder. The crank $i$ is connected with crank $a$ by the driving-rod $a'$, the former crank being made longer, so that as the crank $a$ revolves the crank $i$ will only vibrate and give the desired motion to the feeder, to which it is attached.

The dash-board frame K is secured on top of hopper in any well-known manner, and is to be removed, together with the vibrating feeder H and driving-rod $a'$, when corn and not cotton is to be planted. In the latter event the cotton-planting bottom $g$ above described is withdrawn and the corn-planting bottom $j$ is inserted in its place. This bottom $j$ is constructed with a longitudinal groove, $j'$, having a vertical perforation, $j^2$, in the center, through which the grain falls. Into this groove the slide $l$ is inserted from the opening in forward end of hopper, and is held in position by cleats $j^3$, attached to upper side of said bottom. This slide $l$ is provided with five vertical perforations, $l'$, to allow the seed to fall through as they pass over perforation $j^2$ in bottom. I provide a series of perforations in order that the number of hills planted to each revolution of driving-wheel may be varied by closing in any suitable manner one or more of said perforations. The forward end of this slide is provided with a loop or bearing, $l^2$, for the driving-rod $n$, the rear end of which is bent horizontally and held in place by guides $n'$, while the forward end is attached to crank of wheel A. This rod is constructed with several rectangular bends, $n^2$, whereby greater smoothness is secured in working, and the jarring incident to a straight rod is prevented.

In connection with the corn-planting bottom I use a block, $o$, having a cavity on the under side, and two small brushes, $o'$, on each side, for cutting off all seeds but those in the holes or slot and preventing the corn from choking, said block being held down to bottom by a pin, $o^2$, running through hopper and resting upon top of block. Upon said block rests the separator $p$, dividing the hopper into two compartments, for the better feeding of the corn.

I claim as new and desire to secure by Letters Patent—

In a cotton-planter, the vibrating agitator H, having radial flanges $h'$ and lateral flanges $h^2$ upon its bow, and clamped to the under side of rocking shaft I by means of cuffs $i'$ and clamp-screw $i^2$, in combination with hopper E, having removable adjustable bottom $g$, substantially as shown and described.

JACOB GIPSON WALTON.

Witnesses:
J. M. McKNIGHT,
H. H. KERR.